July 1, 1941.  A. E. WEGMANN  2,247,827

HYDRAULIC BRAKING MEANS

Filed March 14, 1938  6 Sheets-Sheet 1

Adolf E. Wegmann, INVENTOR

July 1, 1941.  A. E. WEGMANN  2,247,827
HYDRAULIC BRAKING MEANS
Filed March 14, 1938   6 Sheets-Sheet 4

Adolf E. Wegmann,
INVENTOR
BY Victor J. Evans & Co.
ATTORNEYS

July 1, 1941.  A. E. WEGMANN  2,247,827
HYDRAULIC BRAKING MEANS
Filed March 14, 1938  6 Sheets-Sheet 5

Adolf E. Wegmann, INVENTOR
BY Victor J. Evans & Co.
ATTORNEYS

July 1, 1941.  A. E. WEGMANN  2,247,827
HYDRAULIC BRAKING MEANS
Filed March 14, 1938    6 Sheets-Sheet 6

Patented July 1, 1941

2,247,827

UNITED STATES PATENT OFFICE 2,247,827

HYDRAULIC BRAKING MEANS

Adolf E. Wegmann, Woodburn, Ind.

Application March 14, 1938, Serial No. 195,891

6 Claims. (Cl. 60—54.6)

My invention relates to hydraulic braking means and particularly to that class adapted for use in connection with tow vehicles and trailers.

One of the principal objects of my invention is to provide hydraulic means for actuating the brakes of tow vehicles and trailers, the trailer means being actuated through the medium of the tow vehicle means.

Another object of my invention is to provide means whereby a trailer braking system may be readily connected to the braking system of a tow vehicle and caused to be operated thereby and under the control thereof.

A further object of my invention is to provide a braking system embodying means for effecting actuation of the trailer brakes coincident with the actuation of the tow vehicle brakes.

A still further object of my invention is to provide means for distributing a like amount of pressure to the brakes of the trailer as well as to the tow vehicle.

Still another object of my invention is to provide means for preventing the waste of operating fluid upon damage to one or more of the brake connecting means.

Other objects and advantages will be apparent from the following description, appended claims and annexed drawings.

Referring to the drawings wherein like reference characters designate like parts throughout the several views.

In teaching my invention, in the preferred embodiment illustrated in Figures 1 to 8 inclusive of the drawings, I provide wheels 20 of a tow vehicle (not shown) with the usual brakes having drums 21 and fluid pressure operating means 22 comprising the usual cylinders and coacting pistons. Said tow vehicle is adapted to be connected to a trailer (not shown) equipped with wheels 23 having brakes supplied with brake drums 24 and fluid pressure brake operating means 25 comprising cylinders and coacting pistons.

Figure 2:
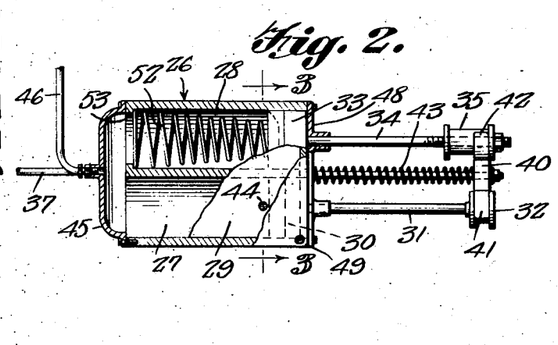
Fig. 2 is a detail view, partly in section, of the master hydraulic device.
Figure 3:
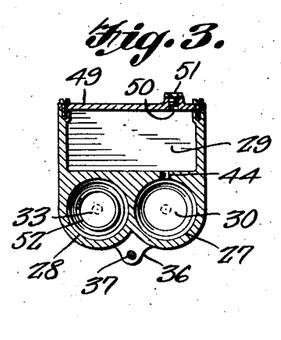
Fig. 3 is a sectional view on a line 3—3 of Fig. 2.

The tow vehicle is provided with a master hydraulic device 26 comprising a cylinder block formed with a pair of cylinders 27 and 28 and a fluid reservoir 29 communicating with the cylinder 27. The cylinder 27 has operable therein a piston 30 having a piston rod 31 equipped with a collar 32 secured on the outer end thereof. The cylinder 28 has operable therein a piston 33 having a piston rod 34 equipped with an elongated collar 35 secured to the outer end thereof. The cylinder block is formed with a guide flange 36 on the outer face thereof subjacent the cylinders 27 and 28, said flange being formed with an aperture for receiving and guiding therethrough a brake rod 37.

One end of the brake rod 37 is pivotally connected to a brake lever 38 having a foot piece, said brake lever being mounted for operation upon a support bar 39 secured to the tow vehicle. The opposite end of said brake rod is connected to a bridge member 40 formed with oppositely disposed yokes 41 and 42 for engaging the collars 32 and 35 respectively. The collar 32 is formed with spaced circumferentially extending shoulders between which the yoke 41 is adapted to fit, the space between said shoulders being approximately the width of the yoke 41. The collar 35 is formed with spaced circumferentially extending shoulders, the space between said shoulders being of a greater length than the space between the shoulders of the collar 32, whereby inward movement of the piston rod 31 is effected in advance of the inward movement of the piston rod 34 (through the medium of the yokes 41 and 42 operated by the brake rod 37) when both piston rods together with their respective pistons are in normal nonoperating position as illustrated in Fig. 2. Positioned on the brake rod 37 and interposed between the flange 36 and bridge 40 is a coil spring 43 coacting with the flange 36 to move the piston rods to normal nonoperating position when pressure is released from the brake lever 38. Between the reservoir 29 and cylinder 27 there is provided a fluid passage 44 located in advance and adjacent the pressure initiating face of the piston 30. Said passage permits fluid from the reservoir 29 to flood the cylinders 27 and 28 when the piston 30 is in nonoperating position. One end of the cylinder block has secured thereto a head 45 effecting communication between the cylinders 27 and 28 and has connected through the outer face thereof one end of a pipe 46. The opposite end of said pipe is connected to an auxiliary hydraulic device 47. The other end of said cylinder block is fashioned with a plate 48 having bored bosses through which the piston rods 31 and 34 are adapted to be operated. The bosses may be formed with suitable stuffing boxes to prevent leakage of the fluid from the cylinders. The top of said cylinder block is provided with a suitable cover 49 enclosing the reservoir 29, a suitable aperture 50 being formed therein to permit filling of the reservoir 29 with a desired fluid. A threaded cap 51 is provided to close the aperture 50. A spiral spring 52 is provided within the cylinder 28, one end engaging a flange 53 formed therein and the opposite end engaging the pressure initiating face of the piston 33, said spring normally urging the piston into nonoperating position.

From the foregoing description, it will be readily understood that the initial high pressure braking will materially retard the momentum of the automobile and then allow a more gentle braking to stop the automobile without discomfort to the riders therein.

Figure 4:
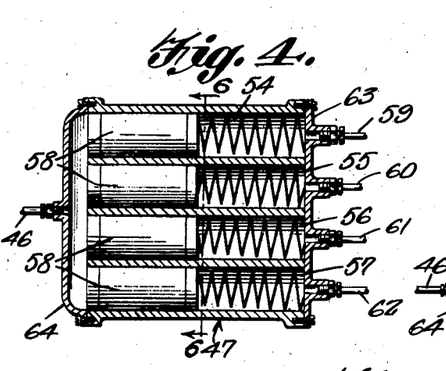
Fig. 4 is a transverse sectional view of the auxiliary hydraulic device.
Figure 5:
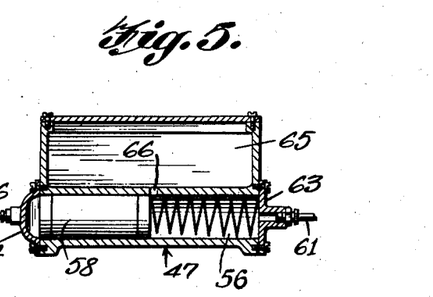
Fig. 5 is a vertical section of the auxiliary hydraulic device.
Figure 6:
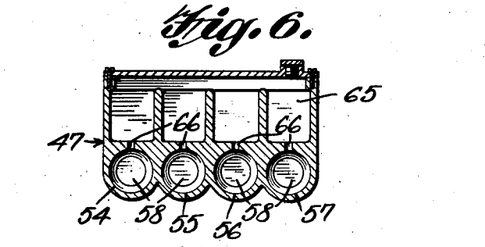
Fig. 6 is a sectional view taken on a line 6—6 of Fig. 4.

The auxiliary hydraulic device 47 comprises a cylinder block formed with a plurality of cylinders 54, 55, 56 and 57 having pistons 58 operable therein. The cylinders 54, 55, 56 and 57 are connected to the fluid pressure operating means 22 on the right rear, right front, left front and left rear wheels, respectively, by means of pipes 59, 60, 61 and 62 respectively. One end of the cylinder block is provided with a plate 63 having bored bosses for connection with said pipes and the opposite end of said cylinder block is fashioned with a head 64 for effecting communication between the cylinders and formed with a bored boss effecting connection with the opposite end of the pipe 46 heretofore described. The cylinder block is formed with a reservoir 65 located above the cylinders and having communication with each of said cylinders by means of respective apertures 66 located in advance of the pressure initiating faces of the pistons 58, said passages permitting fluid from the reservoir 65 to flood the cylinders 54, 55, 56 and 57. In each of the cylinders there is positioned a coil spring coacting therein with the pressure initiating faces of the pistons 58 to maintain the pistons in nonoperating position when the master hydraulic device is in nonoperating condition.

Figure 1:
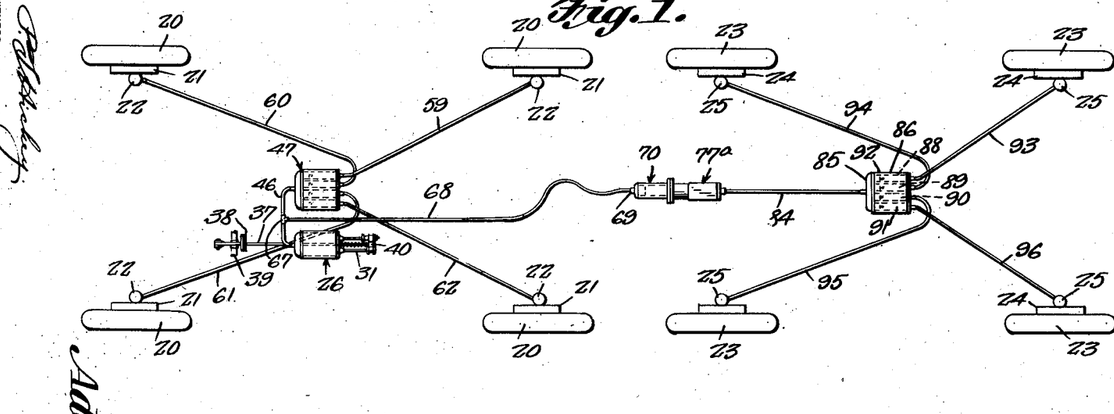
Fig. 1 is a top plan view of my invention.
Figure 7:
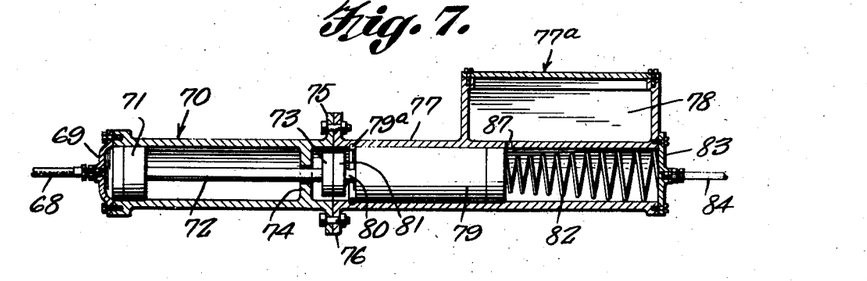
Fig. 7 is a detail sectional view illustrating the coupling and auxiliary master hydraulic device.

Interposed in the pipe 46 between the master hydraulic device 26 and auxiliary hydraulic device 47 is a connection 67 connected to one end of a pipe 68, the opposite end of said pipe 68 being connected to a head 69 of a coupling 70.

The coupling 70 comprises a barrel having a piston 71, operable therein, provided with a plunger rod 72 formed on the outer end thereof with a plunger disk 73. The piston 71 is adapted to be maintained in said barrel and limited in movement in one direction by means of a flange 74 formed internally adjacent the outer end of the barrel. The outer end of said barrel is formed with a circumferentially extending outer flange 75 adapted to be connected to a similar flange 76 formed on the outer end of a cylinder 77 of an auxiliary master hydraulic device 77a. The flanges are connected together by suitable means, for instance bolts and nuts.

The auxiliary master hydraulic device is carried by the trailer and embraces the cylinder 77 formed with a superimposed reservoir 78 having suitable operating fluid therein for replenishing the fluid in the cylinder and also having a piston 79 operable in said cylinder. One end of the piston is provided with a plunger rod 80 having a plunger disk 81 for engagement with the plunger disk 73 carried by the plunger rod 72. The opposite end of the piston 79 is engaged by a spiral spring 82 located in said cylinder and maintained therein by a plate 83 and normally positioning said piston 79 towards the coupling 70. The plate 83 is formed with a bored boss for effecting connection with one end of a pipe 84, the opposite end of said pipe being connected to a head 85 of a second auxiliary hydraulic device 86 carried by the trailer. The reservoir 78 is formed with a passage 87 communicating with the cylinder 77 in advance of the pressure initiating face of the piston 79.

The auxiliary hydraulic device 86 is of similar construction as the auxiliary hydraulic device 47 carried by the tow vehicle, said device being provided with cylinders 88, 89, 90 and 91 having respective pistons operable therein and formed with a fluid reservoir 92 having apertures communicating with each of the cylinders. The cylinders 88, 89, 90 and 91 are connected to the fluid pressure operating means of the right rear, right front, left front and left rear wheels of the trailer, respectively, by means of pipes 93, 94, 95 and 96 respectively.

Each of the reservoirs of the auxiliary hydraulic devices are provided with perpendicular extending partitions interposed between the respective passages communicating with the interior of the cylinders, thereby forming a storage chamber for the fluid for each cylinder. The covers of each of said reservoirs are formed with intake openings closed by suitable caps to permit the refilling of the reservoirs at desired times.

In operation, when pressure is applied to the brake lever 38, the pistons 30 and 33 within the cylinders 27 and 28 will be actuated through the medium of the brake rod 37, bridge 40 and piston rods 31 and 34. Actuation of the pistons 30 and 33 causes fluid within the cylinders 27 and 28 to be forced, under the pressure initiated by said pistons, through the pipe 46 into the auxiliary hydraulic device 47. Fluid forced in the device 47 will in turn actuate the pistons 58 in the cylinders 54, 55, 56 and 57, the fluid contained in said cylinders in turn being forced through the pipes 59, 60, 61 and 62 and actuating the fluid pressure operating means on the wheels 20 to apply the brakes to the drums 21. It is to be understood that the pistons 58 are of a sufficient length to maintain the ports 66 closed during the operation of the pistons and thereby preclude escaping of fluid from the pipe 46 and cylinders 54, 55, 56 and 57 into the reservoirs 65. As the fluid is forced through the pipe 46 to the device 47, the same will also be forced through the connection 67 and pipe 68 into the head 69 of the coupling. Pressure thus forced into the coupling 70 will actuate the piston 71 and through the medium of the plunger rod 72 and disk 73 impart movement to the disk 81 carried by the piston 79 in the second auxiliary hydraulic device carried by the trailer. Actuation of the piston 79 in the device 77a forces liquid therefrom through the pipe 84 into the auxiliary device 86 carried by the trailer and actuates the pistons in the cylinders 88, 89, 90 and 91. Actuation of the pistons in the second auxiliary hydraulic device forces liquid therefrom into the pipes 93, 94, 95 and 96 to operate the fluid pressure operating means and effect actuation of the brakes on the drums 24 carried by the wheels 23 of the trailer.

The master hydraulic device, as heretofore described, comprises cylinder 27 in which the piston 30 is actuated in advance of the piston 33 in cylinder 28. Thus, when the piston 30 is actuated, from the normal nonoperating position shown in Fig. 2, the pressure is higher but the liquid displacement is less than when both pistons 30 and 33 are actuated from their normal non-operating position due to the entire foot force acting on piston 30 only. However, when the loss motion is taken up, by the yoke 42 engaging the shoulder proximous the cylinder 28 and formed on the collar 32, the same foot force acts on both pistons 30 and 33. Therefore, since the pressure developed on the liquid is inversely proportional to the area of the piston surface acting on the liquid, it will be apparent that the initial pressure on the liquid developed by piston 30 only is much higher than the pressure developed by the larger area offered by both pistons, assuming the force or effort exerted by the operator on the foot pedal remains constant. Also, it will be apparent that the amount or quantity of liquid displaced from the master hydraulic device or unit 26 is small when piston 30 only is actuated but is larger when both pistons 30 and 33 are actuated.

When pressure is released from the brake lever or pedal, the springs, in the various cylinders heretofore described including the spring 43, serve to reposition the various pistons in non-operating position for further application of the brakes. Should any of the pipes connecting the cylinders of the auxiliary hydraulic devices to the cylinders of the fluid pressure operating means become damaged or broken, the respective pistons prevent fluid from the pressure side of said pistons from passing into the outlet pipes on the pressure initiating side. It will be apparent, that the hydraulic devices 47 and 86 serve to maintain the pressure in the cylinders of the fluid pressure operating means for applying the braking power on all the wheels to which the pipe lines are intact during the braking operation. The only fluid thus wasted would be that contained in the particular damaged pipe, storage chamber connected to the particular cylinder and the cylinder on the pressure initiating side of the piston.

Figure 8:
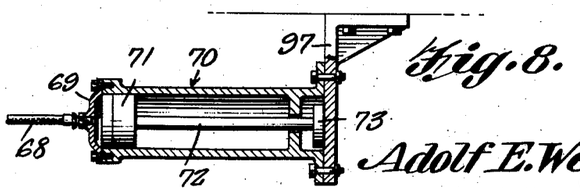
Fig. 8 is a detail sectional view of the coupling illustrating the same attached to the tow vehicle when said tow vehicle is being operated independent of a trailer.

When it is desired to operate the tow vehicle independent of a trailer the flange 75 of the coupling 70 is disconnected from the flange 76 of the auxiliary master hydraulic device 77a. When thus disconnected the flange of the coupling 70 is secured to a plate 97 secured to the tow vehicle as illustrated in Fig. 8. In this position the disk 73, abutting the plate 97, will prevent actuation of the piston 71, the pressure in the pipe 68 being maintained therein. When the coupling 70 is disconnected from the device 77a, the piston 79 is prevented from being forced out of the cylinder 77, through the medium of the spring 82, by means of an expandible ring 79a secured about the inner periphery of the cylinder adjacent the outer end thereof.

Figure 9:
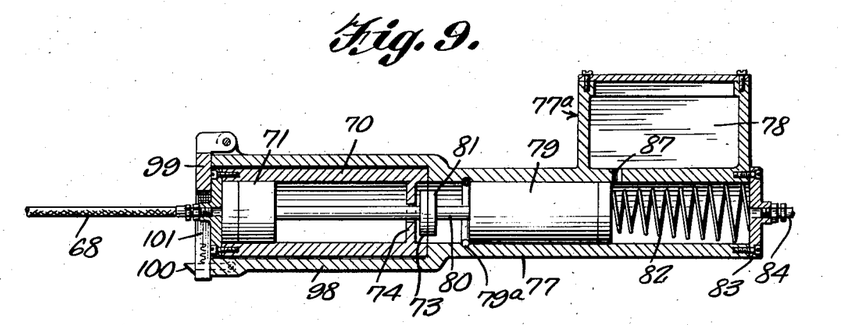
Fig. 9 is a detail sectional view of a modified form connecting the coupling to the auxiliary master hydraulic device.
Figure 10:
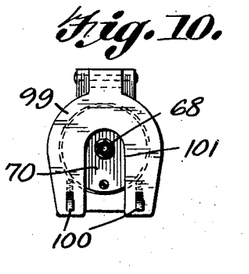
Fig. 10 is an end elevation of the modified form illustrated in Fig. 9.
Figure 11:
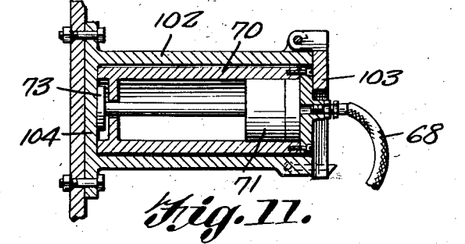
Fig. 11 is a detail sectional view illustrating the coupling attached to a modified form of holding device when the tow vehicle is being operated independent of a trailer.

In Figures 9 and 10, a modified form of connecting the coupling 70 to the auxiliary master hydraulic device 77a is illustrated wherein the outer end of the cylinder 77 is formed with an offset extension 98 for receiving therein the coupling 70. The outer end of the offset section 98 has hinged theerto a plate 99 latched over the head of the coupling by means of a spring actuated latch member 100. The plate is slotted as at 101 to permit the same to be moved upwardly about the hinge pintle without interference with the pipe 68. As clearly illustrated in Figure 11, when it is desired to operate the tow vehicle independent of the trailer, the coupling is detached from within said section 98 and inserted in a housing 102 secured on the tow vehicle. The outer end of the housing is formed with a hinge plate 103 of similar construction and operation to that shown and described in connection with the section 98. The inner wall 104 of the housing functions to prevent operation of the piston 71 by abutting engagement with the plunger disk 73 as heretofore described in connection with the preferred embodiment.

Figure 12:
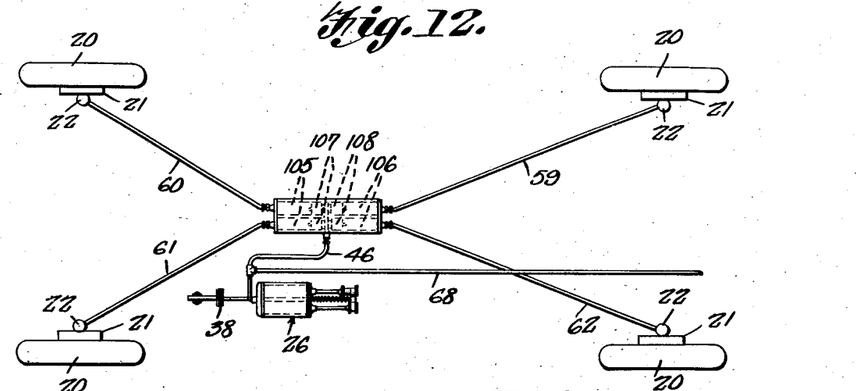
Fig. 12 is a top plan view of a modified form of the auxiliary hydraulic device.
Figure 13:
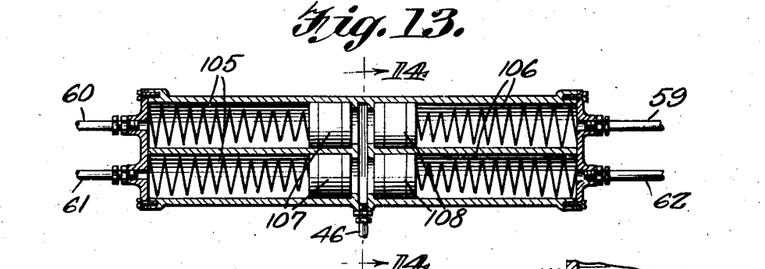
Fig. 13 is a detail sectional view of the modified form of the auxiliary hydraulic device illustrated in Fig. 12.
Figure 14:
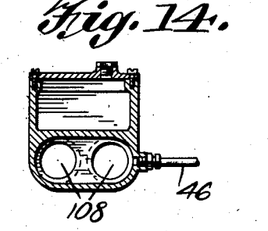
Fig. 14 is a sectional view taken on a line 14—14 of Fig. 13.

In the modification illustrated in Figures 12, 13 and 14 the cylinder block of the auxiliary hydraulic device may be formed with pairs of opposed cylinders 105 and 106 having opposed pistons 107 and 108, respectively, operable therein. In this construction the pipe 46 is connected between the pairs of opposed cylinders as clearly illustrated in Fig. 13. Each pair of the cylinders are provided with outlet pipes connecting the same to the wheels, one pair to the front and one pair to the rear wheels.

Figure 15:
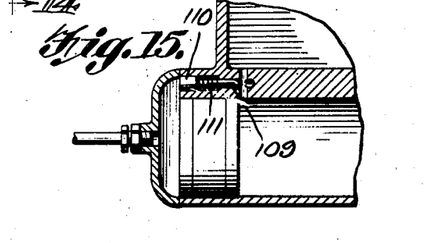
Figures 15, 16 and 17 are detail sectional views of modified forms of construction effecting a closing of the passages communicating with the reservoirs and cylinders during the actuation of the pistons in said cylinders.

In order to prevent liquid from flowing into a cylinder, after the advance of the piston, from the reservoir, I provide a valve, located in the wall above the piston for closing the communicating passage between the reservoir and cylinder, which comprises a valve stem 109 formed with a head 110, the same being operable within a longitudinally extending opening 111 formed in the cylinder wall. One end of the opening is reduced to provide a shoulder, and a coil spring is positioned about the stem between the head 110 and said shoulder to normally position the valve head towards the head of the cylinder. The valve stem 109 is adapted to be actuated by the pressure of the fluid forced into the head and close the communicating passageway between the reservoir and cylinder during the actuation of the piston, the construction being clearly illustrated in Fig. 15.

Figure 16:
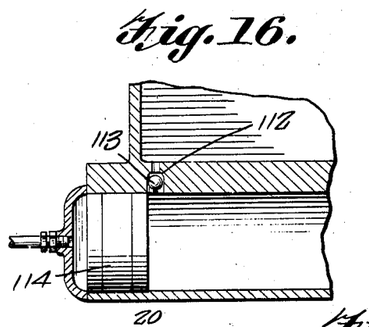

Should it be desired, the passage between the reservoir and cylinder may be formed with a valve seat 112 for accommodating a ball valve 113 as illustrated in Fig. 16. In this construction, when the piston 114 is forced past said passage by the pressure of the fluid, the said fluid will act upon the ball valve 113 in a manner to seat the same within the valve seat 112 thereby effecting a closing of the passage.

Figure 17:
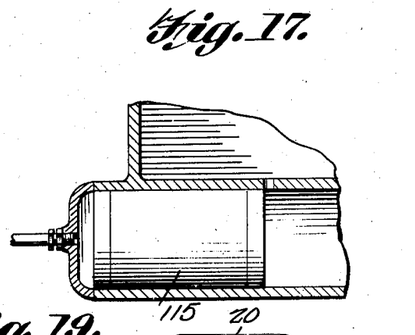

In Fig. 17, the piston 115 is of an elongated type to effect closing of the passage when the same is actuated, the piston being of a length whereby the pressure receiving end does not pass beyond the passage during the actuation of said piston.

Figure 18:
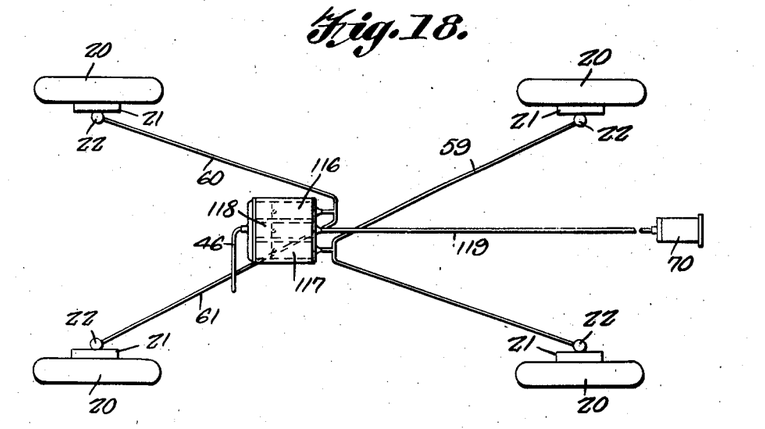
Fig. 18 is a top plan view of another modified form of the auxiliary hydraulic device and the connections thereto.

In the modification illustrated in Fig. 18, the auxiliary hydraulic device carried by the tow vehicle is formed with a pair of cylinders 116 and 117 having interposed therebetween an intermediate cylinder 118. The cylinder 116 has connected thereto the pipes leading to the fluid pressure means 22 for operating the brakes of the front wheels, while the cylinder 117 has like pipes leading to the fluid pressure means for operating the brakes of the rear wheels. The cylinder 118 is connected to the pipe 119 for operating the coupling 70. In this construction the coupling 70 is connected to the auxiliary hydraulic device instead of directly to the master hydraulic device. A pipe 119a connects all of the cylinders to the master hydraulic device.

Figure 19:
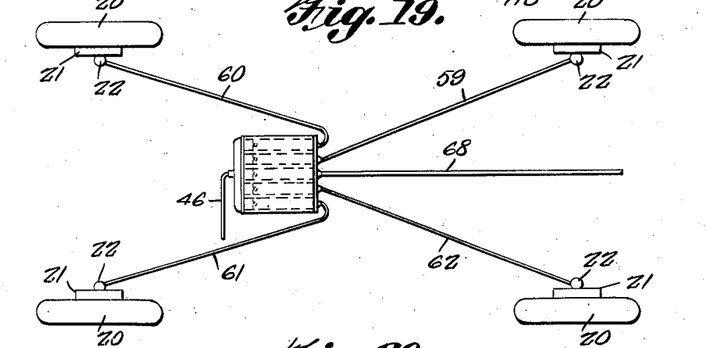
Fig. 19 is a top plan view of still another modified form of the auxiliary hydraulic device.

In the modification illustrated in Fig. 19 the auxiliary device 47 is constructed with an additional cylinder and piston to which is connected the pipe 68. This construction permits of the piston in the coupling 70 to be actuated from the auxiliary device 47 instead of directly from the master hydraulic device 26.

Figure 20:
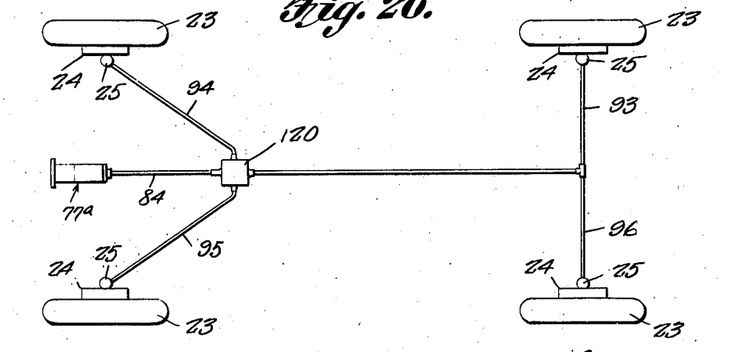
Fig. 20 is a modified form of the auxiliary hydraulic device carried by the trailer.

In Fig. 20 the second auxiliary device, which is carried by the trailer, is modified to provide a housing 120 in which fluid is forced from the auxiliary master device and distributed into pipes leading to the fluid pressure operating means 25 for operating the brakes on the wheels 23.

Figure 21:
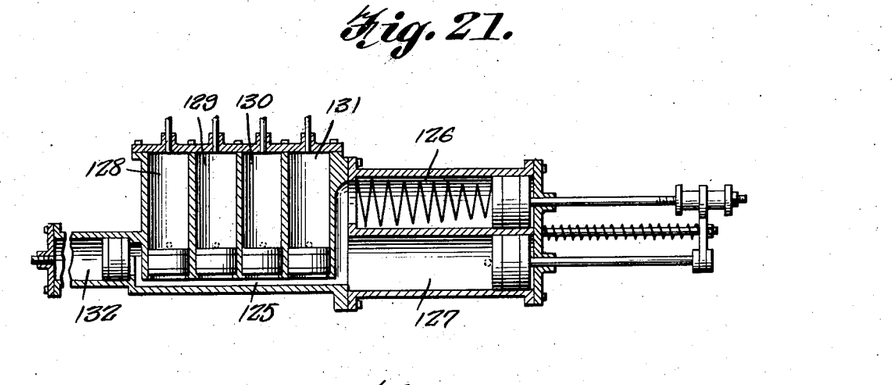
Fig. 21 is a sectional view illustrating a unitary structure comprising the master hydraulic device, auxiliary hydraulic device and coupling.

As illustrated in Fig. 21 the master hydraulic device, the auxiliary hydraulic device and the coupling may be combined into one unit. In this instance, a major passageway 125 communicates with the master cylinders 126 and 127, the auxiliary cylinders 128, 129, 130 and 131 leading to the tow vehicle brakes and to the coupling cylinder 132. This construction permits of the elimination of the pipes 46 and 68 and is adapted to be installed or removed from the tow vehicle as a unit.

Figure 22:
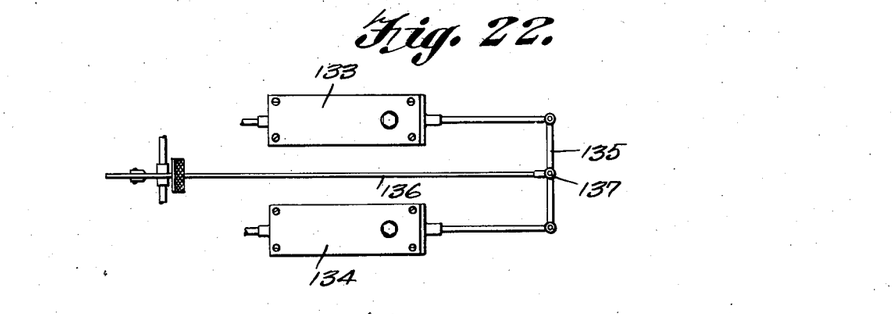
Fig. 22 is a top plan view illustrating another form of the master hydraulic device.

The construction illustrated in Fig. 22 provides for a pair of master cylinders 133 and 134 having pistons operable therein equipped with piston rods. The outer ends of the piston rods are connected together by a link 135 secured to the brake rod 136 as at 137. The cylinder 133 is connected to the front brake mechanism while the cylinder 134 is connected to the rear brake mechanism. Obviously, operation of the brake rod 136 will actuate the pistons in the cylinders 133 and 134 through the medium of their respective connecting rods and the link 135.

Figure 23:
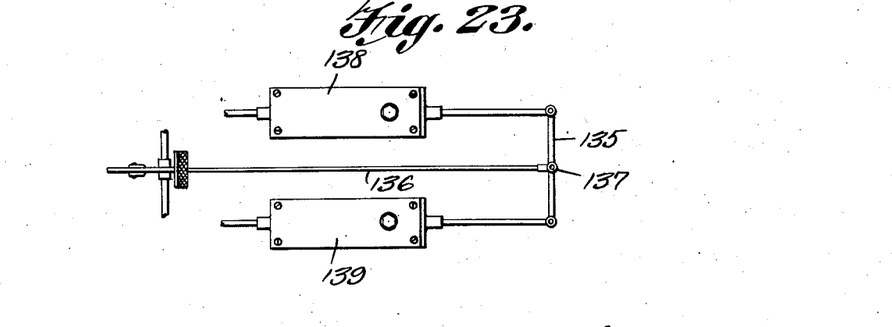
Fig. 23 is another modification of the master hydraulic device similar to that illustrated in Fig. 22.

In Fig. 23 a similar construction is illustrated as in Fig. 22, the cylinder 138 is connected to the tow vehicle brakes while the cylinder 139 is connected to the trailer brake mechanism. In this instance, operation of the brake pedal serves to actuate the pistons in said cylinders to operate the brakes on the trailer simultaneously with the operation of the brakes on the vehicle.

While I have illustrated and described my invention in connection with tow vehicles and trailers, the same may be advantageously used on pleasure cars and the like with or without a trailer. Also, the auxiliary hydraulic device 47 may be used in connection with various makes and styles of master cylinders or like devices.

What I claim is:

1. In a braking system, a hydraulic brake operating device comprising a pair of cylinders, pistons operating in said cylinders, piston rods connected to the pistons and extending parallel to each other, a brake rod between the piston rods, a coil spring surrounding the brake rod, a yoke carried by the outer end of the brake rod and normally outwardly held by the spring, one end of the yoke connected to one of the pistons against longitudinal movement, and the opposite end of the yoke connected to the other piston rod to have a limited movement thereon.

2. In a braking system, a hydraulic brake operating device comprising a pair of parallel cylinders, pistons operating in said cylinders, a piston rod fixed to each of said pistons, a yoke between the piston rods, projections carried by one of said piston rods and between which one end of the yoke passes for positive movement with the piston rod, and a pair of spaced projections carried by the other piston rod and between which the opposite end of the yoke passes for a free limited movement on the piston rod, and a brake rod connected to said yoke.

3. In a braking system, a hydraulic brake operating device comprising a pair of parallel cylinders, pistons operating in said cylinders, a piston rod fixed to each of said pistons, a brake rod between the piston rods, a yoke carried by the free end of the brake rod, a coil spring surrounding the brake rod and normally holding the same and the yoke in an outward position, spaced projections carried by the outer end of one of the piston rods and between which one end of the yoke passes for positive connection therewith, and two spaced projections carried by the other piston rod and between which the opposite end of the yoke passes for a limited independent movement of the yoke.

4. In a braking system, a hydraulic brake operating device comprising a pair of parallel cylinders, pistons operating in said cylinders, a piston rod fixed to each piston, a pair of sleeves fixed to said rods respectively and with one of said sleeves having marginated stops, a yoke between said sleeves and solely movable with one of said stops and slidably connected to the other sleeve between stops, a brake rod passing through a guide carried by the cylinders and connected to the yoke, a coil spring on the brake rod between the guide and the yoke, whereby one sleeve is actuated in advance of the other sleeve.

5. In a braking system, a hydraulic brake operating device comprising a pair of cylinders, pistons operable in said cylinders and each having a piston rod fixed thereto, a pair of sleeves fixed to said rods respectively and with one of said sleeves having marginated stops, a yoke solely movable with the other sleeve and slidably connected to said first defined sleeve between said stops whereby to effect actuation of one of said pistons in advance of the other.

6. In a braking system, a hydraulic brake operating device comprising a pair of cylinders, pistons operable in said cylinders and each having a piston rod fixed thereto, a pair of sleeves fixed to said rods respectively and with one of said sleeves having marginated stops, a yoke solely movable with the other sleeve and slidably connected to said first defined sleeve between said stops whereby to effect actuation of one of said pistons in advance of the other, and resilient means connected to said yoke for positioning the latter with respect to said first defined sleeve to effect actuation of the other sleeve in advance of said first defined sleeve.

ADOLF E. WEGMANN.